(No Model.)

A. BERGER, C. HÉMAIN (VEUVE) CORNET & C. MARTIN.
HEATING CUP.

No. 468,147. Patented Feb. 2, 1892.

Witnesses
Chas. H. Smith
J. Staib

Inventors:
Anatole Berger.
Catherine Hemain, veuve Cornet
Charles Martin
per Lemuel W. Serrell
att'y

THE NORRIS PETERS CO., PHOTO-LITHO., WASHINGTON, D. C.

United States Patent Office.

ANATOLE BERGER AND CATHERINE HÉMAIN (VEUVE) CORNET, OF LYONS, AND CHARLES MARTIN, OF LIMOGES, FRANCE.

HEATING-CUP.

SPECIFICATION forming part of Letters Patent No. 468,147, dated February 2, 1892.

Application filed March 23, 1891. Serial No. 385,983. (No model.) Patented in France July 30, 1890, No. 205,002.

*To all whom it may concern:*

Be it known that we, ANATOLE BERGER and CATHERINE HÉMAIN (widow) CORNET, residing at Lyons, France, and CHARLES MARTIN, residing at Limoges, France, citizens of the Republic of France, have invented an Improvement in Heating-Cups, (for which Letters Patent have been granted to us in France, dated July 30, 1890, No. 205,002,) of which the following is a specification.

The object of this invention is to maintain the heat of liquids contained in cups and used as a beverage while such contents are being consumed. A saucer is provided for the cup or similar vessel, and in the center of the saucer is a recess adapted to the reception of a piece of incandescent carbon, and there are openings to admit air, so that the carbon is consumed and the heat of the cup is maintained thereby.

Figure 1:
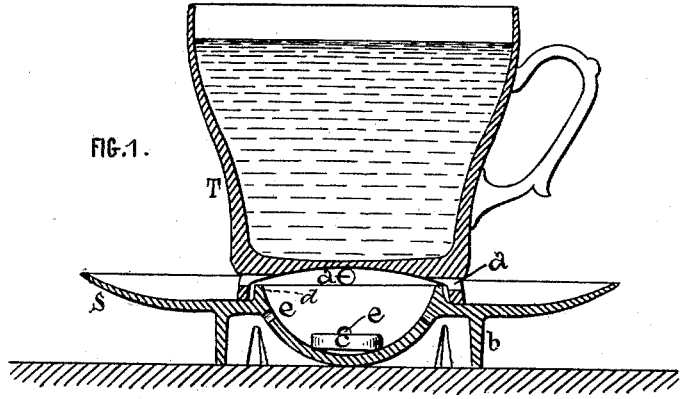
Figure 2:
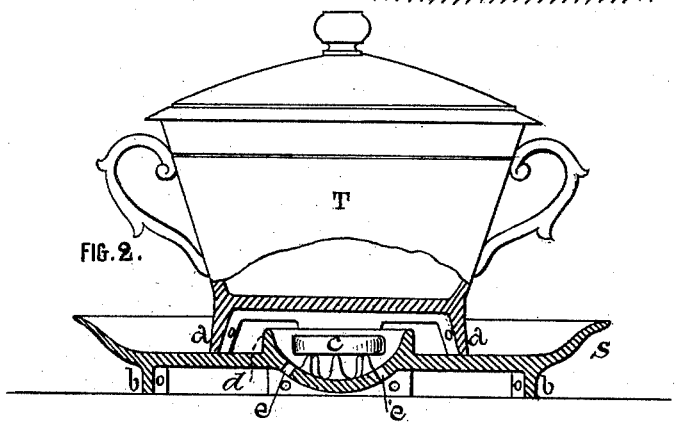

In the drawings, Figure 1 is a vertical section of our improvement; and Fig. 2 is an elevation, partially in section, representing a vessel of a different shape from that shown in Fig. 1.

The cup T or vessel for holding tea, coffee, soup, or other liquid is of any desired size or shape, and the same is preferably provided with a handle or handles, by which it may be easily moved, and such vessel T is supported upon a rim, through which there are holes or openings, as shown at $a$, that allow for the passage of heated products of combustion.

The saucer S is of suitable size and shape for receiving the vessel T, and this saucer is elevated by legs or supports $b$ to the desired extent above the table upon which it is placed, and in the central portion of the saucer is a depression or cup $d$, of a size adapted to receive a cake or piece of carbon $c$, of a size sufficient for furnishing by its combustion the requisite heat for maintaining the proper temperature in the contents of the cup or other vessel T, and there are openings $e$ through the saucer at the recess $d$, by which atmosphere is admitted sufficient for promoting the combustion of the carbon $c$, and this carbon $c$ is advantageously supported upon fingers or rests, as seen in Fig. 2, so as to be raised sufficiently from the bottom of the recess for atmosphere to pass freely beneath such carbon and promote its combustion. It will now be apparent that the liquid material in the cup or vessel T will be maintained at the proper elevated temperature while being served or consumed by simply placing a live coal or piece of incandescent carbon into the recess in the saucer S and then placing the vessel T in position, and during the combustion of the piece of carbon $c$ the heat given off will act directly upon the under side of the cup or vessel T.

We are aware that in many instances a lamp has been placed beneath a vessel to heat the same; but this is expensive and not easy of application to ordinary cups and saucers or vessels for holding soup, &c. By our present invention a small piece of carbon can be inserted in position, and it is entirely safe, and the saucer and vessel can be washed and cleansed in the usual manner and no separate lamp or fuel-holding device is required.

We claim as our invention—

1. The cup or vessel having downwardly-projecting supports with openings for the escape of gases, in combination with a saucer for receiving the cup and having a central recess for the reception of a piece of carbon and openings for the passage of air to the same, substantially as specified.

2. The combination, with the cup or vessel T, of a saucer having a recess for the insertion of a piece of incandescent carbon to maintain the heat in the contents of the cup or vessel, and fingers in the lower part of the recess for supporting such carbon, there being openings for the admission of air and for the escape of gases during the combustion of the carbon, substantially as set forth.

The foregoing specification of our improvement in heating-cups, &c., signed by us this 26th day of January, 1891.

ANATOLE BERGER.
  CATHERINE HÉMAIN (VEUVE) CORNET.
  CHS. MARTIN.

Witnesses:
  YVIN RABILLOUX,
  GASTON JEANNIAUX.